United States Patent
Shukla et al.

(10) Patent No.: US 12,031,009 B2
(45) Date of Patent: Jul. 9, 2024

(54) DISSOLVABLE DOWNHOLE HYDRAULIC FRACTURING TOOLS COMPOSED OF BULK METAL GLASS AND THERMOPLASTIC POLYMER COMPOSITES

(71) Applicant: Halliburton Energy Services, Inc., Houston, TX (US)

(72) Inventors: Shashwat Shukla, Singapore (SG); Arpana Singh, Singapore (SG); Sandeep Thatathil, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/847,849

(22) Filed: Jun. 23, 2022

(65) Prior Publication Data
US 2023/0416494 A1    Dec. 28, 2023

(51) Int. Cl.
*E21B 33/10*    (2006.01)
*C08K 3/08*    (2006.01)

(52) U.S. Cl.
CPC ............... *C08K 3/08* (2013.01); *E21B 33/10* (2013.01); *C08K 2003/085* (2013.01); *C08K 2003/0893* (2013.01); *E21B 2200/08* (2020.05)

(58) Field of Classification Search
CPC .......... E21B 33/10; E21B 33/12; E21B 33/13; E21B 23/04; E21B 34/14; E21B 34/142;
(Continued)

(56) References Cited

U.S. PATENT DOCUMENTS 8,211,247 B2 * 7/2012 Marya ................... C22C 1/0408
                                                  148/420
10,364,629 B2 * 7/2019 Jacob ...................... E21B 34/14
(Continued)

FOREIGN PATENT DOCUMENTS

| EP | 3144018 A1 | 3/2017 | |
|---|---|---|---|
| WO | 2017100417 A1 | 6/2017 | |
| WO | WO-2017100417 A1 * | 6/2017 | ............ E21B 29/02 |

OTHER PUBLICATIONS

Sharma, et al.; "Review of the Recent Development in Metallic Glass and Its Composites"; Metals 2021, 11, 1933; 29 pages. https://www.mdpi.com/journal/metals.
(Continued)

*Primary Examiner* — Angela M DiTrani Leff
(74) *Attorney, Agent, or Firm* — Scott Richardson; Parker Justiss, P.C.

(57) ABSTRACT

A downhole hydraulic frac tool for use in a hydraulic fracturing system, the frac tool comprising a dissolvable frac tool member that includes a water-dissolvable composition, the composition including: a water-soluble thermoplastic polymer; and water-soluble bulk metallic glass (BMG) particles, wherein: the BMG particles are embedded within a matrix of the water-soluble thermoplastic polymer, the BMG particles have a greater tensile strength than a tensile strength the water-soluble thermoplastic polymer, and the BMG particles have a higher fracture toughness than a fracture toughness the water-soluble thermoplastic polymer. A method of manufacturing a dissolvable downhole hydraulic frac tool member and, a hydraulic fracturing system associated with a wellbore in which dissolvable downhole hydraulic frac tools of the disclosure can be used, are also disclosed.

14 Claims, 8 Drawing Sheets

Figure 1:
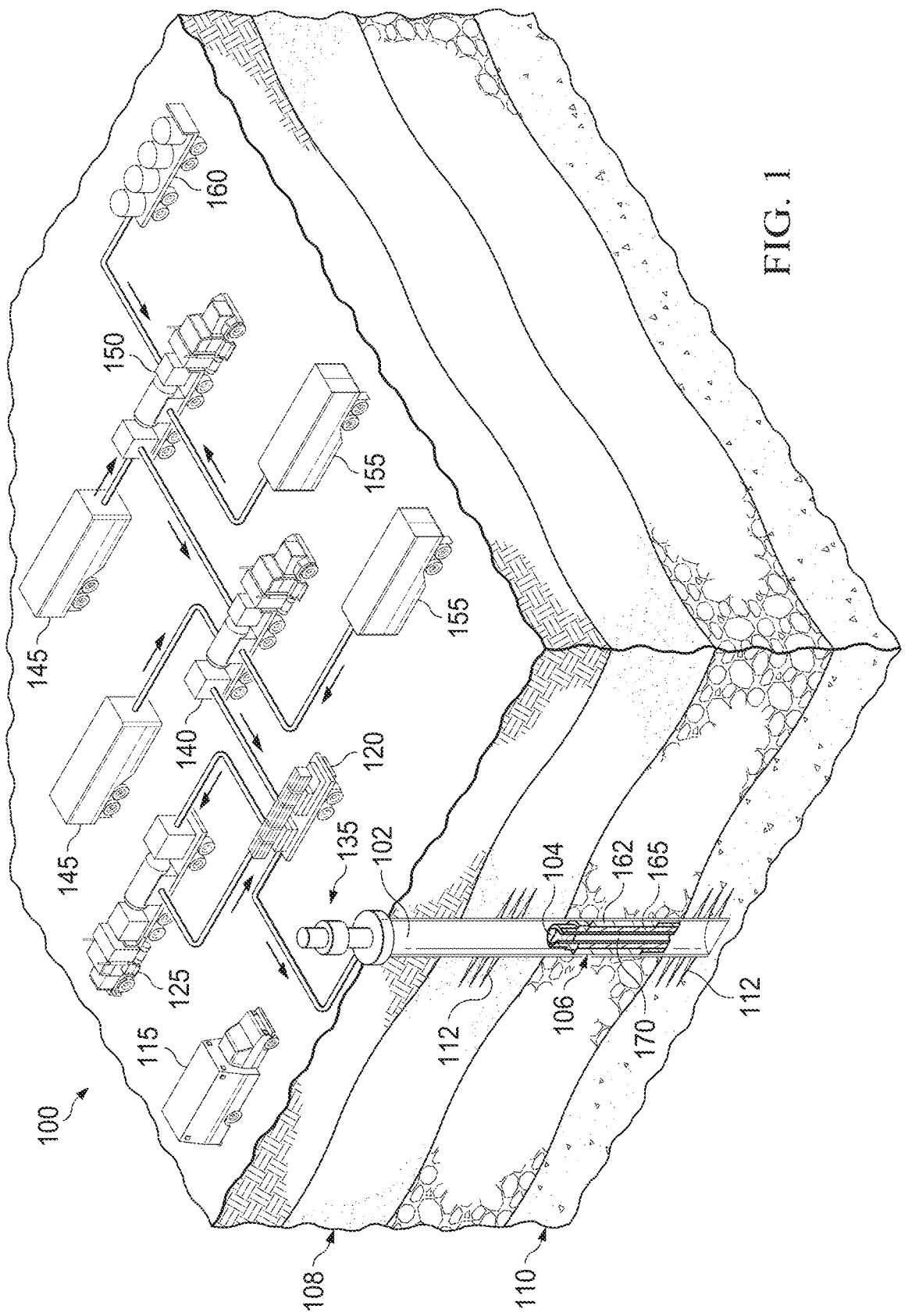

(58) Field of Classification Search
CPC ....... E21B 33/00; E21B 2208/08; C08K 3/00;
C08K 3/01; C08K 3/10; C08K 3/105;
C08K 3/08; C08K 2003/0818; C08K
2003/085
See application file for complete search history.

(56) References Cited

U.S. PATENT DOCUMENTS

| | | | | |
|---|---|---|---|---|
| 11,761,296 | B2* | 9/2023 | Jiang | ........................ C22C 32/00 166/382 |
| 2007/0107908 | A1* | 5/2007 | Vaidya | ..................... C09K 8/80 166/376 |
| 2013/0300066 | A1* | 11/2013 | Xu | .......................... C22C 32/00 277/336 |
| 2014/0196899 | A1* | 7/2014 | Jordan | .................... C22C 32/00 427/314 |
| 2015/0184486 | A1 | 7/2015 | Epstein | |
| 2015/0337615 | A1* | 11/2015 | Epstein | ................. E21B 33/134 166/65.1 |
| 2016/0333187 | A1* | 11/2016 | Bauer | .................. C09D 201/00 |
| 2017/0067323 | A1* | 3/2017 | Katterbauer | ............ G06F 17/13 |
| 2017/0107419 | A1 | 4/2017 | Roy et al. | |
| 2017/0113275 | A1 | 4/2017 | Roy et al. | |
| 2017/0175487 | A1 | 6/2017 | Marcin et al. | |
| 2018/0086894 | A1* | 3/2018 | Roy | ......................... E21B 29/02 |
| 2018/0363409 | A1 | 12/2018 | Frazier | |
| 2019/0032435 | A1 | 1/2019 | Kochanek et al. | |
| 2020/0308945 | A1 | 10/2020 | Surjaatmadja et al. | |
| 2021/0187604 | A1 | 6/2021 | Sherman et al. | |
| 2023/0383615 | A1* | 11/2023 | Seren | ...................... E21B 23/00 |

OTHER PUBLICATIONS

Takahashi, et al.; "Degradation Study on Materials for Dissolvable Frac Plugs"; Unconventional Resources Technology Conference; URTeC: 2901283; Jul. 23-25, 2018; 9 pgs.

Jin, et al.; "Dissolvable Tools in Multistage Stimulation"; Society of Petroleum Engineers; SPE-186184-MS; SPE/IATMI Asia Pacific Oil & Gas Conference and Exhibition; Oct. 17-19, 2017; 10 pgs.

Roy, et al.; "Water Reactive Alloys with artificial Intelligence, Smart Plugs Formulation for the Middle East and North Africa"; Society of Petroleum Engineers; SPE-203383-MS; Abu Dhabi International Petroleum Exhibition & Conference; Nov. 9-12, 2020; 8 pgs.

Walton, et al.; "Dissolvable Metal vs. Dissolvable Plastic in Downhole Hydraulic Fracturing Applications"; OTC-27149-MS; Offshore Technology Conference; May 2-5, 2016; 10 pgs.

"Dissolvable Frac Plugs Market Report"; Stratview Research; Jun. 2019; 6 pgs. https://www.stratviewresearch.com/491/dissolvable-frac-plugs-market.html.

"Amorphous Metals"; Heraeus; 5 pgs. https://www.heraeus.com/en/group/products_and_solutions_group/amorphous_metals/about_amorphous_metals/about_amorphous_metals.html.

Shukla, et al.; "Nanocrystallization in driven amorphous materials"; SciVerse ScienceDirece; Elsevier; Acta Materialia, vol. 61, Issue 9; May 2013; 8 pgs.

Shukla, et al.; "Evidence of anti free volume creation during deformation induced nanocrystallization of Nd—Fe—B metallic glass"; rapid research letters; Physica Status Solidi (RRL), 5(6); 2011; 4 pgs.

Dambatta, et al.; "Mg-based bulk metallic glasses for biodegradable implant materials: A review on glass forming ability, mechanical properties, and biocompatibility"; Journal of Non-Crystalline Solids; Elsevier; May 10, 2015; 6 pgs.

Cao; "Processing and Properties of Biocompatible Metallic Glasses"; The University of New South Wales, School of Materials Science and Engineering; PhD Thesis; 2013; 201 pgs.

Chen, et al.; "Fast-Scanning Chip-Calorimetry Measurement of Crystallization Kinetics of Poly(Glycolic Acid)"; pllymers; MDPI; 2021; 10 pgs.

Mukherjee, et al.; "Viscosity and specific volume of bulk metallic glass-forming alloys and their correlation with glass forming ability"; Science Direct; Elsevier; Acta Materialia; Apr. 14, 2004; 7 pgs.

Liang, et al.; "Effects of Ag, Nd, and Yb on the Microstructures and Mechanical Properties of Mg—Zn—Ca Metallic Glasses"; metals; MDPI; Sep. 19, 2018; 10 pgs.

Zhao, et al.; "Influence of Cu content on the mechanical properties and corrosion resistance of Mg—Zn—Ca bulk metallic glasses"; International Journal of Minerals, Metallurgy and Materials, vol. 21, No. 5; May 2014; 7 pgs.

"Typical Values of Surface Energy for Materials and Adhesives"; TWI; 2022; 5 pgs. https://www.twi-global.com/technical-knowledge/faqs/faq-what-are-the-typical-values-of-surface-energy-for-materials-and-adhesives.

https://www.clextral.com/technologies-and-lines/technologies-et-procedes/co-extrusion/.

Takayama, et al.; "Mechanical properties of bio-absorbable PLA/PGA fiber-reinforced composites"; Journal of Mechanical Science and Technology; Springer/ KSME; Aug. 22, 2013; 4 pgs.

Palacios, et al.; "Characterization and Thermal Degradation of Poly(d,l-Lactide-co-Glycolide) Composites with Nanofillers"; Polymer Engineering and Science; 2013; 16 pgs.

Suryanarayana, et al.; "Iron-based bulk metallic galsses"; International Materials Reviews, vol. 58, No. 3; 2013; 37 pgs.

Gun, et al. "Superplastic flow of a Mg-based bulk metallic glass in the supercooled liquid region"; Elsevier; ScienceDirect; Journal of Non-Crystalline Solids; Feb. 2006; 7 pgs.

"Polystyrene"; Millipore Sigma; 2022; 4 pgs. https://www.sigmaaldrich.com/US/en/product/aldrich/43110.

Wang, et al.; "Mg-based bulk metallic glasses: Elastic properties and their correlations with toughness and glass transition temperature"; Materials Research Society; Journal of Materials Research, vol. 26, No. 7; Apr. 14, 2011; 12 pgs.

"What is PLA?"; BioPak Team; 2021; 5 pgs. https://www.biopak.com/sg/resources/what-is-pla.

Fambri, et al.; "Role of Surface-Treated Silica Nanoparticles on the Thermo-Mechanical Behavior of Poly(Lactide)"; MDPI; Applied Sciences; Sep. 4, 2020; 20 pgs.

Naik, et al.; "The effect of the type of HA on the degradation of PLGA/HA composites"; Elsevier; Materials Science and Engineering; May 30, 2016; 16 pgs.

Sprengholz; "Industrial Ram Extrusion as Innovative Tool for the Development of Biodegradable Sustained Release Implants"; Ludwig-Maximilians Univeristy; 2014; 211 pgs.

\* cited by examiner

DISSOLVABLE DOWNHOLE HYDRAULIC FRACTURING TOOLS COMPOSED OF BULK METAL GLASS AND THERMOPLASTIC POLYMER COMPOSITES

BACKGROUND

As part of wellbore completion, it is often necessary regulate fluid flow into or out of various portions of the wellbore using downhole hydraulic fracturing tools ("frac tools"). While the use of frac tools made of dissolvable materials can be more convenient than deploying tools using service strings and/or wirelines, there are stringent demands placed on such materials. Certain polymer dissolvable materials can be lightweight and have predictable dissolution rates but may not have adequate strength and toughness. Certain metal dissolvable materials can be strong and tough, but may be heavy and have a dissolution rate that is strongly dependent on wellbore chemistry. Water-reactive nanocrystalline alloy dissolvable materials can be expensive, lack scalability and have unpredictable dissolution behavior. There is a continuing need in wellbore completion technology to design frac tools, or part members thereof, made of dissolvable materials that are economical, scalable, and lightweight, while still maintaining good mechanical properties and having a predictable dissolution behavior.

BRIEF DESCRIPTION

Figure 2A:
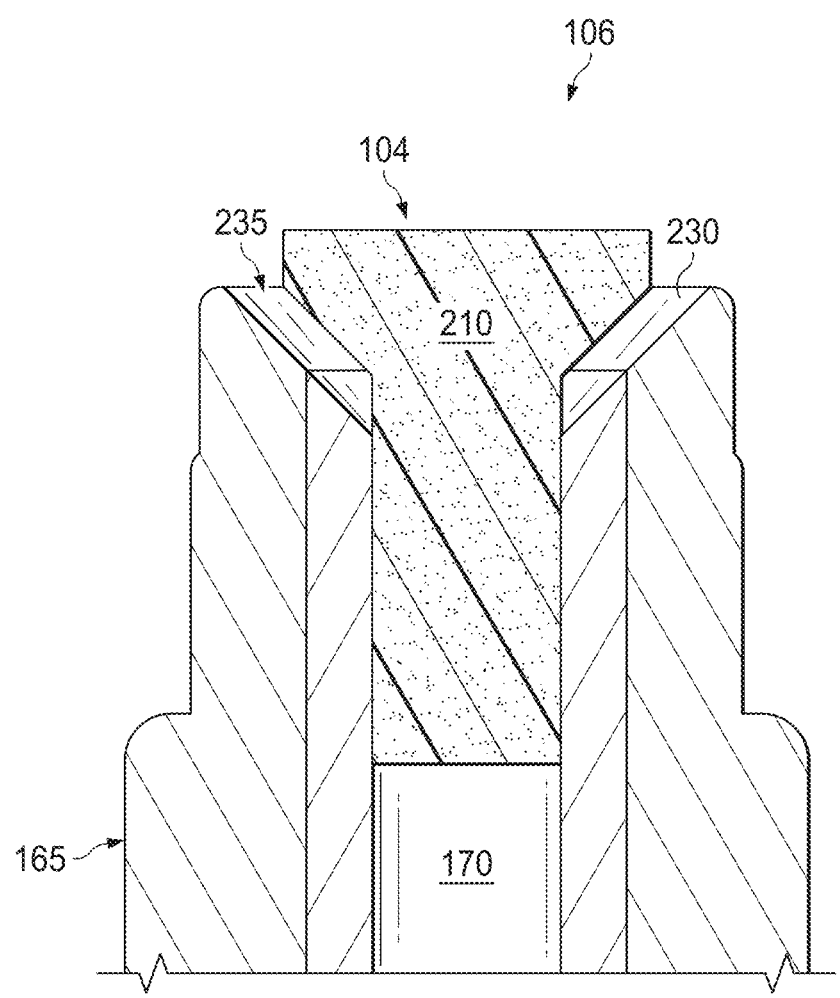
Figure 2B:
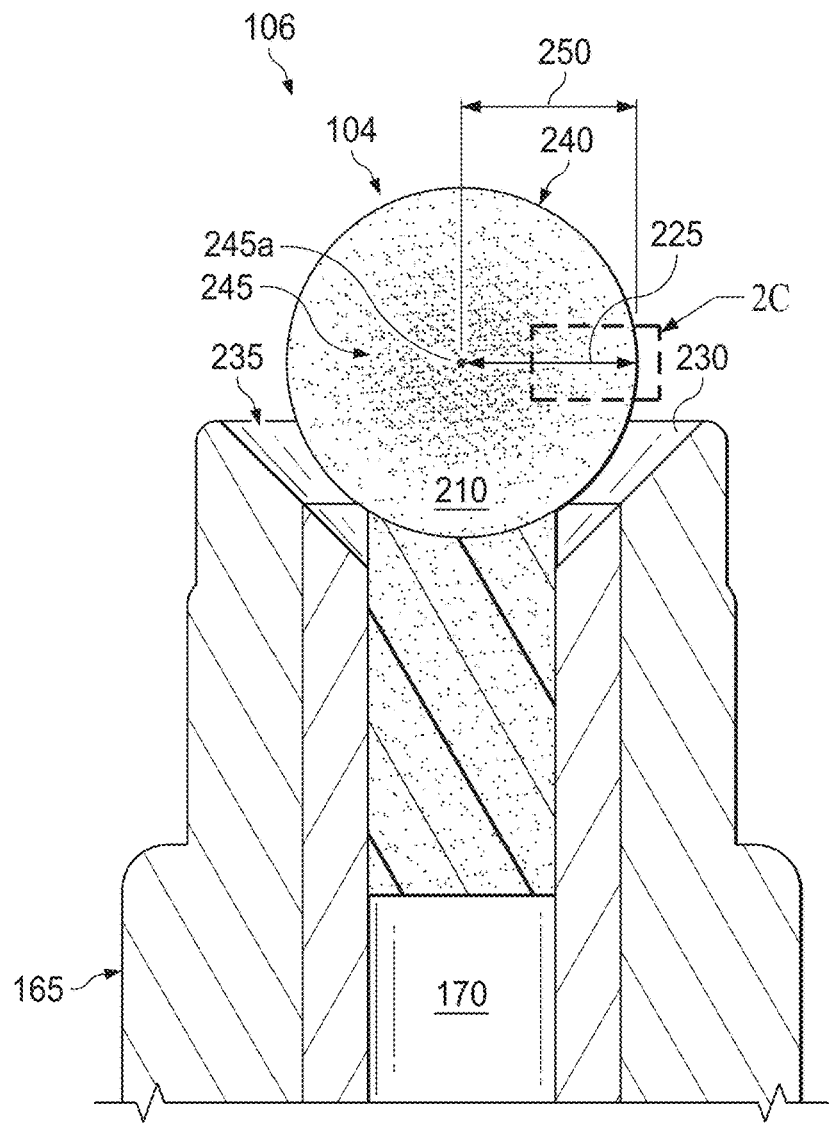
Figure 2C:
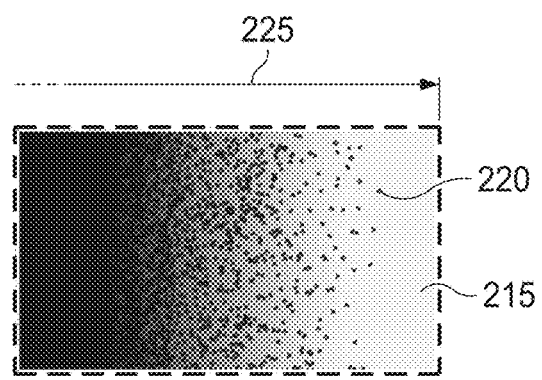
Figure 3:
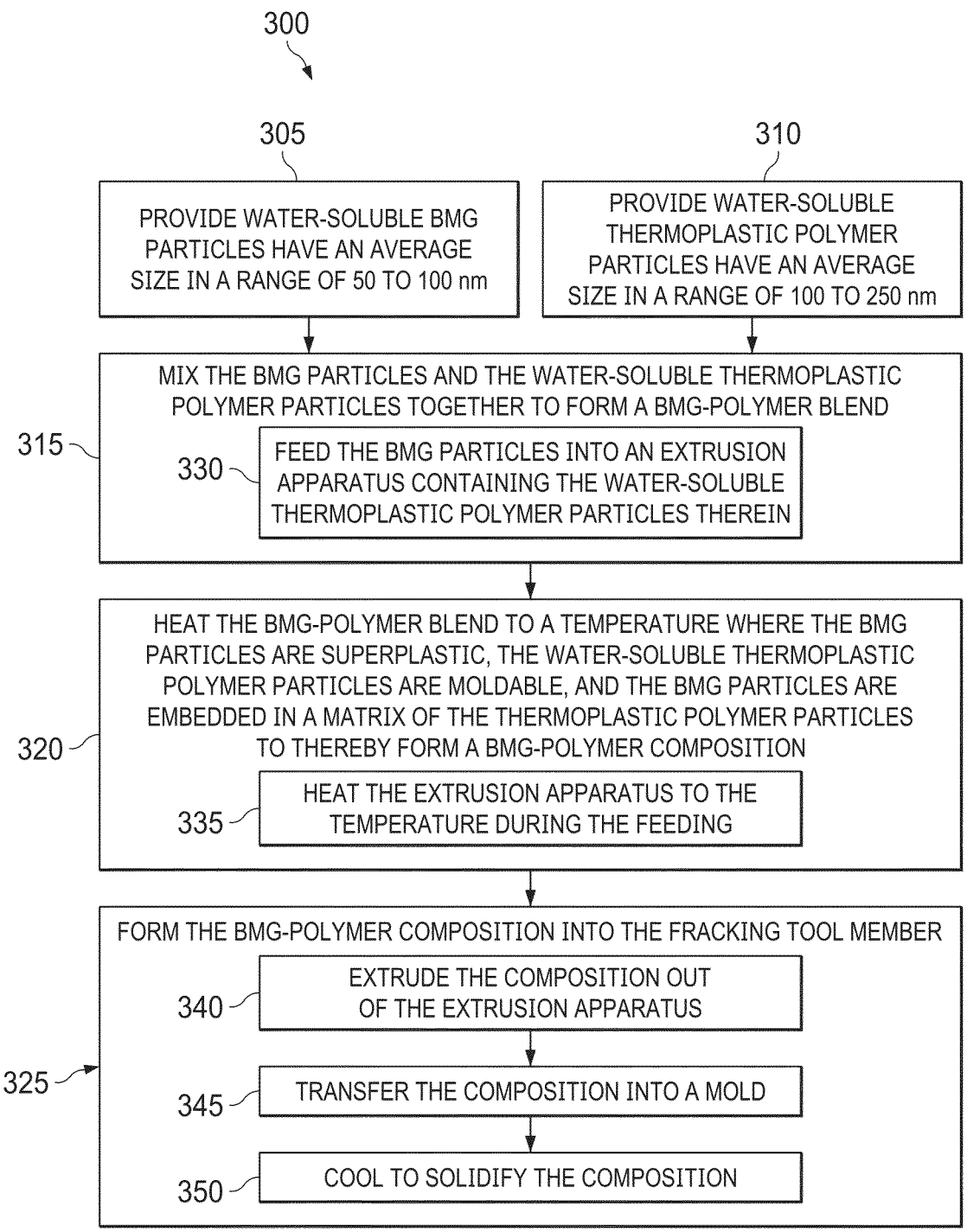
Figure 4:
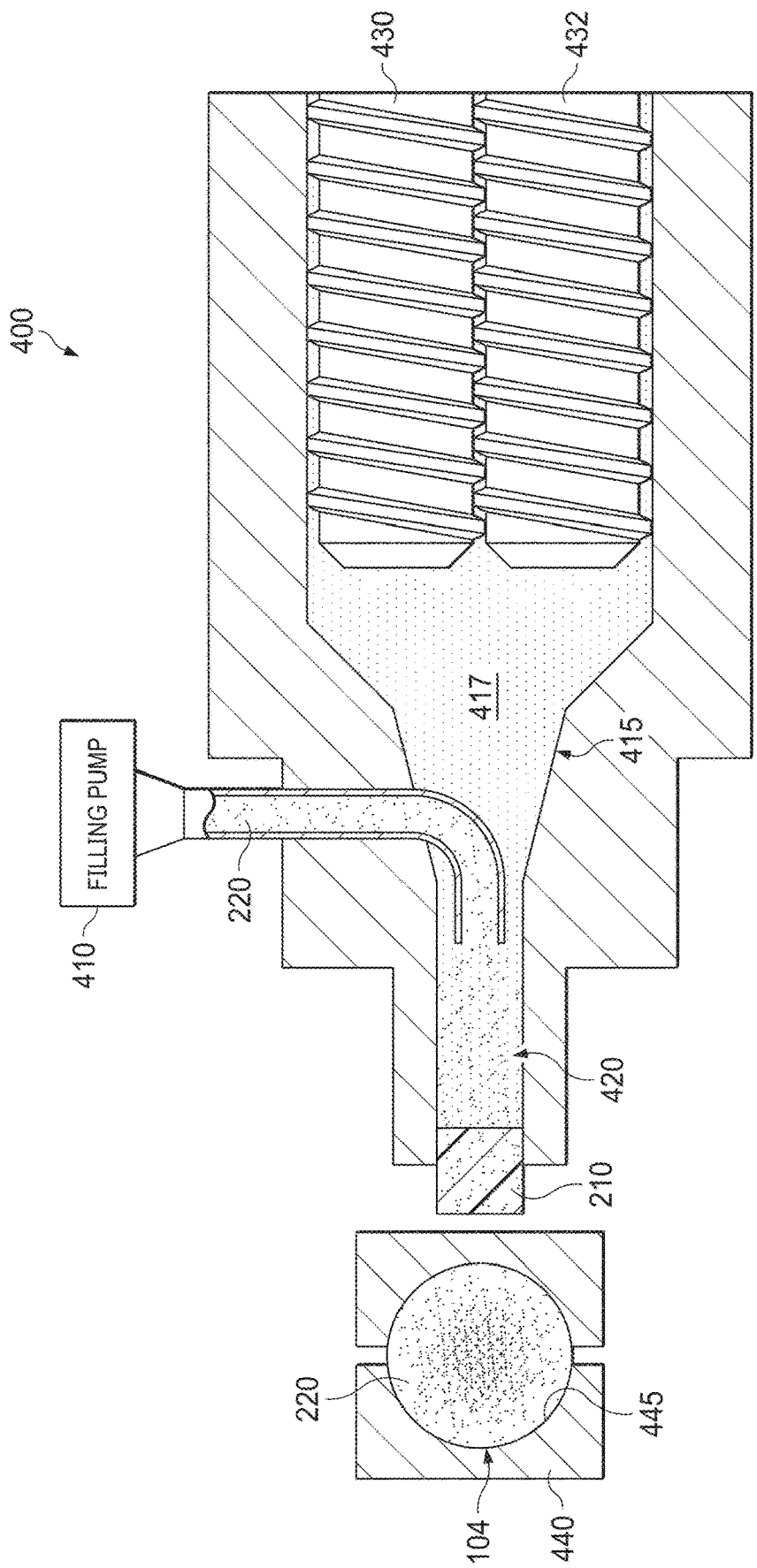
Figure 5:
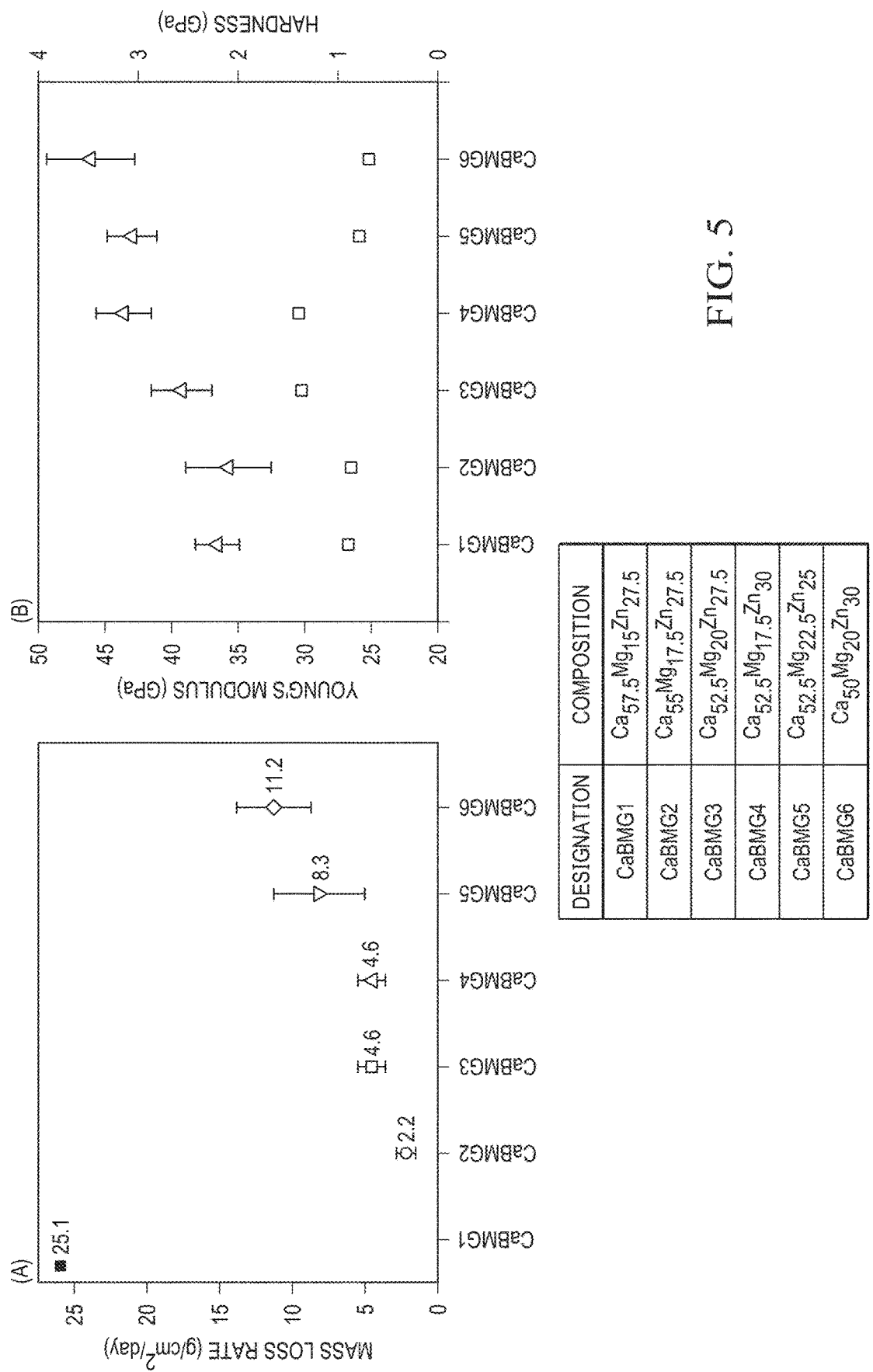
Figure 6:
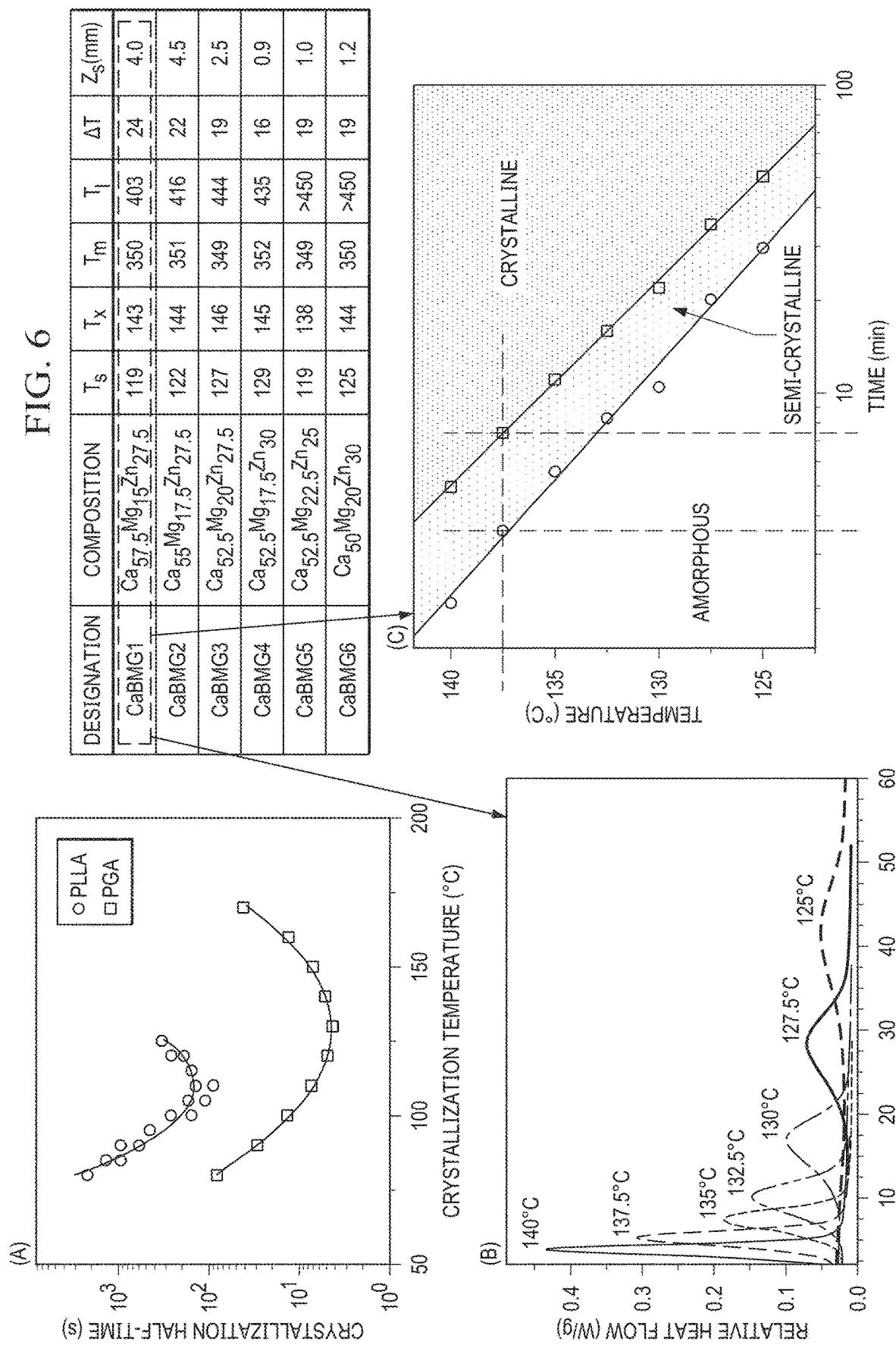
Figure 7:
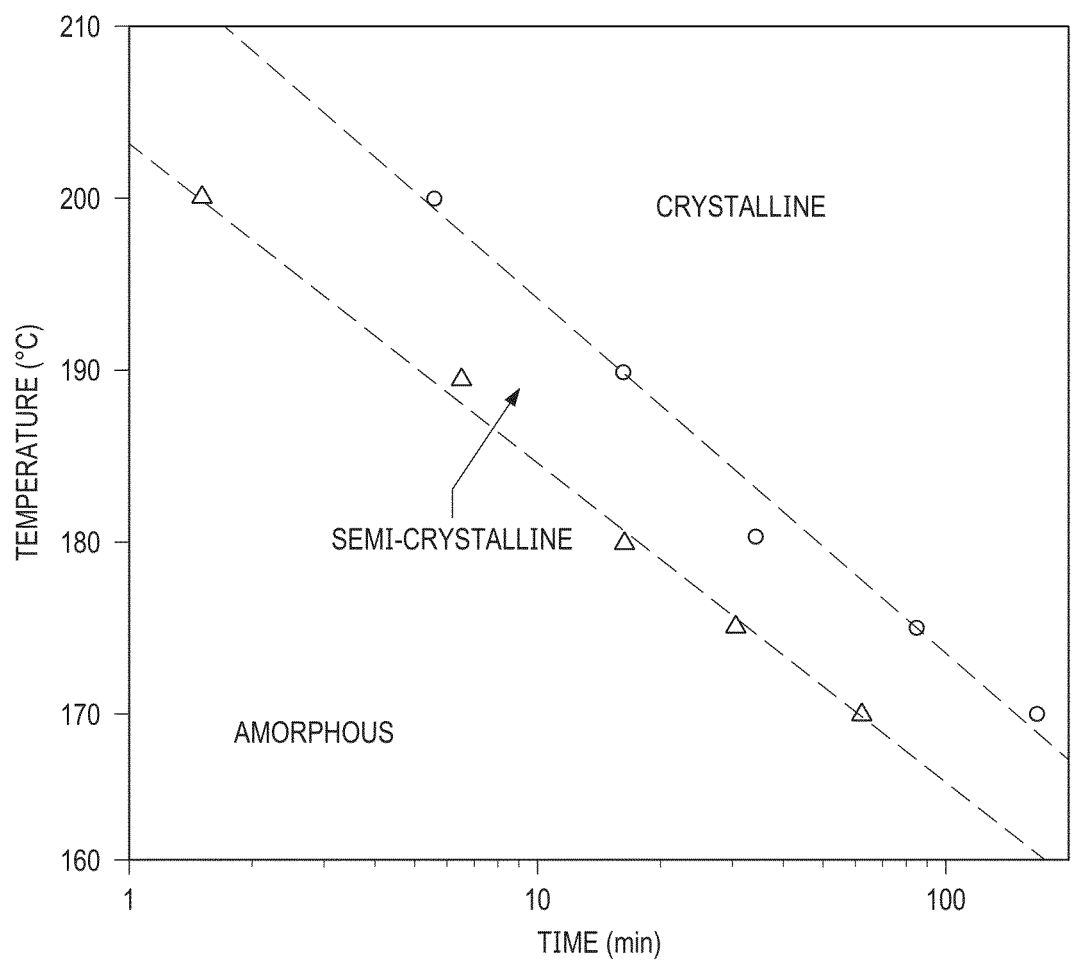

Reference is now made to the following descriptions taken in conjunction with the accompanying drawings, in which:

FIG. 1 illustrates a general view of an example hydraulic fracturing system associated with a wellbore in which dissolvable downhole hydraulic frac tools of the disclosure can be used;

FIG. 2A presents a perspective view of an example dissolvable downhole hydraulic fracturing member, in the form of a fracing plug, deployed in a frac tool;

FIG. 2B presents a prospective view, analogous to that shown in FIG. 2A, including an example dissolvable downhole hydraulic frac tool member, in the form of a frac ball, deployed in the frac tool;

FIG. 2C presents a prospective view and schematic representation of portion of the dissolvable composite material of the frac tool member presented in FIG. 2B, showing an example graded structure with different proportions of thermoplastic polymer and BMG particles along at least one dimension of the tool member;

FIG. 3 presents an example flow diagram to illustrate embodiments of a method of manufacturing a dissolvable downhole hydraulic frac tool member including any embodiments the members discussed in the context of FIGS. 1-2C;

FIG. 4 presents a schematic view of an extrusion apparatus used as part of some embodiments of the method of manufacture, such as disclosed in the context of FIG. 3;

FIG. 5 presents A) example dissolution rates of example BMG particles of the disclosure and, B) example Young's Modulus and Hardness values, of the example BMG particles;

FIG. 6 presents A) amorphous-crystalline transition times for example polymers of the example compositions of the disclosure B) thermal properties of example calcium-based metal alloy BMG particles of the example compositions and C) example processing windows for the example BMG particle CaBMG1 shown in FIG. 6B; and FIG. 7 presents example processing windows for example magnesium-based BMG particles.

DETAILED DESCRIPTION

As part of the present disclosure we have discovered that dissolvable downhole hydraulic frac tools made of composite material that include both water-soluble thermoplastic polymers (referred to as "polymers" herein) and water-soluble BMG particles (referred to as "BMG particles" herein) have substantially increased strength and toughness compared to the polymer alone. As part of the present disclosure, we realized that wide ranging amounts of BMG particles can be embedded in a matrix of the polymer at elevated temperatures (e.g., above room temperature and in some embodiments above 100° C.) where the polymer becomes moldable and the BMG particle becomes superplastic and hence also flowable and moldable at the same elevated temperatures. This allows the use of techniques analogous to that used for molding or forming polymers alone into frac tools. Upon cooling, the composition solidifies to form a frac tool or frac tool member with increased strength and toughness depending on the amounts of BMG particles incorporated, as further disclosed below. Moreover, because embodiments of the polymer and BMG particles are flowable and moldable at the elevated temperature, different blends or graded blends with different proportions of BMG particles to polymer can be adjusted for different tool members or even within the tool member itself. This in tern, allows the fine-tuning of the strength, toughness, dissolution rate, or other properties of the composition, and the tool members made of the composition, as further disclosed herein.

In the drawings and descriptions that follow, like parts are typically marked throughout the specification and drawings with the same reference numerals, respectively. The drawn figures are not necessarily to scale. Certain features of this disclosure may be shown exaggerated in scale or in somewhat schematic form and some details of conventional elements may not be shown in the interest of clarity and conciseness. Some specific embodiments are described in detail and are shown in the drawings, with the understanding that they serve as examples and that they do not limit the disclosure to only the illustrated embodiments. Moreover, it is fully recognized that the different teachings of the embodiments discussed, infra, may be employed separately or in any suitable combination to produce desired results.

Unless otherwise specified, any use of any form of the terms such as "press," "connect," "engage," "couple," "attach," or any other term describing an interaction between elements is not meant to limit the interaction to direct interaction between the elements but include indirect interaction between the elements described, as well. In the following discussion and in the claims, the terms "including" and "comprising" are used in an open-ended fashion, and thus should be interpreted to mean "including, but not limited to." Further, any references to "first," "second," etc. do not specify a preferred order of method or importance, unless otherwise specifically stated but are intended to designate separate elements. The various characteristics mentioned above, as well as other features and characteristics described in more detail below, will be readily apparent to those skilled in the art with the aid of this disclosure upon reading the following detailed description of the embodiments, and by referring to the accompanying drawings.

FIG. 1 illustrates a general view of an example hydraulic fracturing system 100 associated with a wellbore 102 in which any of dissolvable downhole hydraulic frac tool members 104 (referred to herein as "tool member", e.g., a frac plug insert or frac ball) and frac plug tools 106 (referred to herein as "tool") of the disclosure can be used. Once discrete formation intervals 108, 110 for different fracture stages are identified or reached, the tool 106, with the tool member 104 inserted in place in the tool, can be positioned in the wellbore 102 to isolate the intervals 108, 110 from each other and a conventional hydraulic fracturing operation may be used to create fractures 112 in the intervals 108, 110 to increase formation porosity for the purpose of increasing oil or gas production. The fracturing system 100 can include, among other things, an operation control unit 115, a manifold unit 120, a frack pump 125, and a wellhead tree 135 to cap the wellbore 102. The fracturing system 100 can also include a slurry blender system 140 where a hydrated gel is combined with the other fracturing additives and proppant (e.g., sand). The slurry blender system 140 can include one or more of the following: fluid tanks 145, a gel blender 150, and other fracking component storage tanks 155, such as chemical and sand storage tanks. A gel hydration apparatus 160 can be coupled to the slurry blender system 140. One skilled in the pertinent art would understand how fracturing fluid, pumped into the wellbore 102 at a high rate to increase the pressure in the wellbore 102, could be used as part of the system 100 to create or increase fractures 112 in the formation intervals 108, 110. For instance, the fracturing fluid can includes a hydrated gel, can be pumped along with the proppant into the fractures 112 to prop the fractures in the formation open, thereby, effectively increasing the formation's porosity.

One skilled in the pertinent arts would understand how the tool 106 could be located in the wellbore 102, e.g., between an already fractured lower interval 110 and an upper interval 108 to be fractured, to serve as a fluid isolation barrier between the intervals 108 110. For instance, once the tool 106 is positioned at a target location in the wellbore 102, a conventional swellable or mechanical packer element 162, wrapped around a mandrel 165 of the tool 106, can be radially expanded in the wellbore 102 to seal off fluid flow between the intervals 108, 110.

One embodiment of the disclosure is a downhole hydraulic fracturing tool ("frac tool") for use in a hydraulic fracturing system. FIG. 2A presents a perspective view of an upper segment of the tool 106 as depicted in the system 100 shown in FIG. 1, including an example dissolvable frac tool member 104 ("tool member"), in the form of a frac plug, deployed in the frac tool. FIG. 2B presents a perspective view of the frac tool, analogous to that shown in FIG. 2A including an example tool member, in the form of a frac ball, deployed in the frac tool. FIG. 2C presents a perspective view of the frac ball and a schematic representation of portion of the water-dissolvable composite material 210 of the frac tool member 104 such as shown in FIG. 2B, and further depicts an example graded structure with different proportions of thermoplastic polymer matrix 215 and BMG particles 220 along at least one dimension 225 of the tool member 104 as further disclosed herein.

With continuing reference to FIGS. 1-2C throughout, the frac tool member 104 can be shaped as a plug (e.g., a cylindrical shaped plug with a conically Y-shaped top) to rest on a seat of an upper end of the mandrel (e.g., on slanted sidewalls 230 of a seat 235 of the mandrel 165, FIGS. 2A and 2B) and further shaped to fit in a flow passage of the mandrel (e.g., flow passage 170 in the mandrel 165 of the tool 106, FIG. 1). In other embodiments, however, the frac tool member could have other shapes to match the shape of the seat of mandrel, e.g., a frac plug with a T-shaped profile, to mate with an inversely shaped mandrel seat 235, as familiar to those skilled in the pertinent art.

The tool member 104 includes, or is, a water-dissolvable composition 210. The composition includes a water-soluble thermoplastic polymer e.g., FIG. 2C, polymer matrix 215) and water-soluble BMG particles (e.g., FIG. 2C, particles 220). The BMG particles are embedded within a matrix of the water-soluble thermoplastic polymer, the BMG particles have a greater tensile strength than a tensile strength of the water-soluble thermoplastic polymer with no BMG particles present (e.g., "the polymer alone"), and the BMG particles have a higher fracture toughness than a fracture toughness of the polymer alone.

The term polymer matrix, as used herein, refers to a continuous phase of the water-soluble thermoplastic polymer holding the BMG particles embedded therein.

Embodiments of BMG particles can have a temperature of superplastic flowability that is in a moldability temperature range of the water-soluble thermoplastic polymer. A temperature of superplastic flowability refers to a temperature range, between a crystallization temperature (Tx) and a glass transition temperature (Tg) of the BMG particles, where the BMG particles are superplastic. The term superplastic, as used herein, refers to the ability of the BMG particle to exhibit a large tensile elongation (e.g., 500% elongation or higher) at an elevated temperatures. A moldable polymer refers to the thermoplastic polymer being softened or flowable at the elevated temperature to the extent where it can be shaped into the frac tool member.

Some embodiments the BMG particles can be superplastic at the temperature of superplastic flowability for a time period of at least 300 minutes, e.g., a time period in a range from 300 to 600 minutes in some embodiments, thereby facilitating a large processing time window for tool member fabrication.

Embodiment of the BMG particle, when superplastic, can advantageously be highly wettable to the polymer, indicative of a high level of interfacial interactions between the BMGs and polymer matrix. Such high levels of interfacial interactions between the BMG particles and the polymer can be characterized in terms of a low contact angle between the BGMs, when in a super fluid state, and the polymer matrix has a contact angle of, e.g., less than 90 degrees and, in some embodiments, in a range from 20 to 40, 40 to 60, 60 to 80 degrees. Those skilled in the pertinent art would be familiar with procedures to measure contact angles. High levels of interfacial interaction, due to wetting between the BMG particles and polymer, promotes infiltration and embedding of the BMG particles in the polymer matrix, which in turn, strengthens the BMG-polymer composition as compared to the polymer alone. For instance, glass transition temperatures (Tg) of some embodiments of the composition can be at least 10, 20, 30, or 50% higher than the polymer alone.

While embodiments of the BMG particles typically have an amorphous structure, in some embodiments, the BMG particles can have a partially amorphous structure. Those skilled in the pertinent art would be familiar with procedures, such as transmission electron microscopy (TEM) procedures, to measure and characterize the BMG particles as fully or partially amorphous.

Some embodiments of the composition 210 can include a weight percent of the BMG particles that is a value in a range from 1 to 35 wt % (e.g., 1 to 10, 10 to 20, 20 to 30, 30 to 35 wt % for various compositions) of a total weight of the composition and balance the water-soluble thermoplastic polymer. Advantageously, the presence of embedded BMG particles increases the strength and toughness of the composition as compared to the polymer alone. This is in contrast to certain dissolvable metal particles, which when incorporated into a polymer, can cause a loss in strength or toughness.

For some such embodiments, the weight percent value of the BMG particles in the composition 210 can be varied by at least 50 wt % along at least one dimension of the frac tool member 104. As non-limiting examples, if the wt % of the BMG near an exterior surface 240 of the tool member 104 equals a value of 'x' (e.g., x equals 1, 10, 15, 17.5 wt %), then, in the bulk interior location (e.g., interior location 245) the wt % can equal at least '2x' (e.g., 2, 20, 35 wt %, respectively). As illustrated in FIGS. 2B and 2C, in some such embodiments, the least one dimension 225 can be a radial distance between the exterior surface 240 to an interior location (e.g., central interior location 245a) of the frac tool that is at least 1, 2, 3, or 4, cm from the exterior surface.

As a non-limiting example, consider a tool member 104 shaped as a frac ball such as depicted in FIG. 2C having a radius 250 value in a range from 2 cm to 100 cm. Some embodiments of the frac ball can be fabricated such that the weight percent of the BMG particles various from as low as 1 wt % at the exterior surface 240 to as high as 35 wt % at the central interior location 245a. The variation in the weight percent value of the BMG particles along a 10 to 50 cm portion of the radius of ball could linear or curvilinear, over the entire diameter or over just a portion of the radius (e.g., 10, 20, 30, 50 or 70% portions of the entire radius). In some such embodiments, it is advantageous for the exterior surface of the frac tool member to be made of predominantly the polymer (e.g., 99, 95, 90 wt % polymer) so that the onset of dissolution can be substantially controlled by the glass transition temperature (Tg) similar to that of the polymer alone. In various embodiments, the variation in the weight percent of the BMG particles along the least one dimension can be graded to change from a low value at the exterior surface 240 to a high value at an interior location in the tool member (e.g., location 245 and in some embodiments central location 245a). In other embodiments, the inverse variation, from a high value to a low value, or more complex variations or combinations of portions with variations variation in the weight percent of the BMG particles, and, other portions with a constant value in the weight percent of the BMG particles, would be apparent in view of the present disclosure. For example, as illustrated in FIGS. 2B and 2C, the tool member 104 exterior surface 240 can be predominantly be composed of the polymer, while the BMG content can increase with depth into the tool member and then saturates such that along a least a portion of the at least one dimension 225 the weight percent of the BMG particle is a constant value (e.g., a weight percent variation of less than ±0.1, ±1, ±2, or ±5 weight percent per cm, in various embodiments).

In embodiments of the frac tool member 104 shaped and deployed as a frac plug, a tensile strength that is higher than that obtained for the polymer alone is sometimes desirable. For instance, while for a polyglycolic acid (PGA) polymer alone, the tensile strength can equal 100 MPa, embodiments of the composition 210 composed of PGA with BMGs embedded therein can have a tensile strength of greater than 100 MPa, in proportion to the weight percentage of the BMG particles that are embedded in the polymer to therefore form the composition 210. As non-limiting examples, BMGs composed of Mg66Zn30Ca4 can have a tensile strength of 750 MPa. BMGs composed of $Ca_{57.5}Mg_{15}Zn_{27.5}$, $Ca_{55}Mg_{17.5}Zn_{27.5}$, $Ca_{52.5}Mg_{20}Zn_{27.5}$, $Ca_{52.5}Mg_{22.5}Zn_{25}$ or $Ca_{50}Mg_{20}Zn_{30}$ can have a tensile strength 500 MPa. Accordingly, a composition including PGA and such BMG particles embedded therein can have tensile strength values that are at least 5, 10, 25, 50, 100, 200 or 300 percent higher than the tensile strength of the polymer alone, depending on the weight percentage of the BMG particles (e.g., 1 to 35 wt %) that are embedded in the polymer, while still having a water-dissolvable composition.

In embodiments of the frac tool member 104 shaped and deployed as a frac ball, a fracture toughness that is greater than that obtained for the polymer alone is sometimes desirable. For instance, while for a PGA polymer alone, the fracture toughness can equal 1.5 MPa √m, embodiments of the composition 210 composed of PGA with BMGs embedded therein can have a fracture toughness of at least 2 MPa √m (e.g., greater than or equal to 2, 3, 4, 5, 6, 7 or 8 Mpa √m). As non-limiting examples, BMGs composed of $Mg_{59.5}Cu_{22.9}Ag_{6.6}Gd_{11}$ can have a fracture toughness of 8 Mpa √m. Accordingly, a composition including PGA and such BMG particles embedded therein can have fracture toughness values that are at least 5, 10, 25, 50, 100, 200 or 250 percent higher than the fracture toughness of the polymer alone, depending on the weight percentage (e.g., 1 to 35 wt %) of the BMG particles that are embedded in the polymer, while still having a water-dissolvable composition.

Some embodiments of the BMG particles of the disclosure can be composed of a first alkaline earth metal as a major element, a second different alkaline earth metal as a first minor element and a second minor element of zinc Some embodiments of the BMG particles of the disclosure can be composed of a calcium-based metal alloy or a magnesium-based alloy. The term calcium-based as used herein means that calcium is the major element present in the metal alloy on a weight percent basis. The term magnesium-based as used herein means that magnesium is the major element present in the metal alloy on a weight percent basis.

In some embodiments a weight percent of calcium in the calcium-based metal alloy is at least 50 wt %, and in some embodiments the weight percent of calcium in the calcium-based metal alloy is a value in a range from 50 wt % to 58 wt %. In some such embodiments the calcium-based alloy can further include magnesium and zinc. In some such embodiments, a weight percent of the magnesium in the calcium-based metal alloy can be a value in a range from 15 to 20 wt % and the calcium-based metal alloy can be balance the zinc. In some such embodiments, a weight percent of the zinc in the calcium-based metal alloy can be a value in a range from 25 to 30 wt % and the calcium-based metal alloy is balance the magnesium. Non-limiting examples include BMGs composed of $Ca_{57.5}Mg_{15}Zn_{27.5}$ ("CaBMG1"), $Ca_{55}Mg_{17.5}Zn_{27.5}$ ("CaBMG2"), $Ca_{52.5}Mg_{20}Zn_{27.5}$ ("CaBMG3"), $Ca_{52.5}Mg_{17.5}Zn_{30}$ ("CaBMG4"), $Ca_{52.5}Mg_{22.5}Zn_{25}$ ("CaBMG5") or $Ca_{50}Mg_{20}Zn_{30}$ ("CaBMG6").

A non-limiting example of an Mg-based alloy includes $Mg_{59.5}Cu_{22.9}Ag_{6.6}Gd_{11}$.

Calcium-based and magnesium-based alloys can have adjustable rapid dissolution rates while still improving mechanic properties of the tool member such as tensile strength and fracture toughness.

Other embodiments of the BMG particles of the disclosure can be composed of a titanium-based alloy, a zirconium-based alloy or other hydrophilic alloys. Non limiting example titanium-based alloys include: compositions based on TiCuNi alloys such as: $Ti_{74.8}Ni_{13.1}Cu_{12.1}$, $Ti_{50}Ni_5Cu_{45}$, $Ti_{7.8}Ni_{13.3}Cu_{12.3}Ge_{3.6}$, and $Ti_{66.6}Cu_{12.5}Ni_{13.6}Ge_{7.3}$; compositions based on TiZrBe alloys such as: $Ti_{40}Ni_8Cu_9Be_{18}Zr_{25}$ and $Ti_{40}Zr_{25}Be_{30}Cr_5$; compositions based on TiZrCu alloys such as: $Ti_{40}Zr_{10}Cu_{34}Pd_{16}$ and $Ti_{40}Zr_{10}Cu_{32}Pd_{14}Sn_4$; and compositions based on TiZrSi alloys such as: $Ti_{70}Zr_6Fe_7Si_{17}$ and $Ti_{64}Zr_5Fe_6Si_{17}Mo_6Nb_2$. Non limiting example zirconium-based alloys include: compositions such as: $Zr_{52.5}Ti_5Cu_{17.9}Ni_{14.6}Al_{10}$, $Zr_{67}Cu_{10.6}Ni_{90.8}Ti_{8.8}Be_{3.8}$, $Zr_{55}Cu_{30}Al_{10}N_{15}$, and compositions based on ZrCuNiNbAl alloys. While some embodiments of BMGs composed of titanium-based or zirconium-based alloy may not have as rapid a dissolution rate as some calcium-based and magnesium-based alloys, such titanium-based or zirconium-based alloy can provide even greater increases in the mechanical properties of the tool member as compared to BMGs composed of calcium-based and magnesium-based alloys In some embodiments, it is advantageous for the BMG particles to have one or more elements with a high surface energy (e.g., 1300 mJ/m$^2$ or higher) because such elements can promote the formation of strong interfacial interactions to promote bonding between the polymer and BMG particles, which in turn, can result in improvements in the composition's mechanical properties such as higher tensile strength and greater fracture toughness. For instance, increased interfacial bonding between the BMG particles and polymer matrix can result in effective transfer of the desired mechanical properties of the BMG particles to the polymer matrix. The surface energy of calcium-based or magnesium-based alloys can be increase by including in the composition 210, alkali earth metal elements, transition metal elements or rare earth elements (the lanthanide series and scandium and yttrium) that have such a high surface energy. Non limiting examples of such elements include e.g., Pt (surface energy 2672 mJ/m$^2$), (surface energy Ni 1770 mJ/m$^2$) or Cu (surface energy 1360 mJ/m$^2$).

Based on the present disclosure one skilled in the pertinent art would appreciate how alternative BMG compositions, including different combinations of the above disclosed elements, and that show good wettability when embedded in the polymer, would fall within the scope of the disclosure.

In some embodiments, to facilitate suppression of stress-induced softening, which in turn can be associated with reduced toughness of the tool member 104, it is advantageous for the BMP particles to have an average size of less than 100 μm, e.g., an average diameter value in a in a range of 50 to 100 nm for some embodiments. One skilled in the pertinent art would understand how processes such as rapid solidification (e.g., melt-spinning, splat-quenching, micro-injection molding, suction casting, or rapid discharge forming), followed by mechanical milling (e.g., ball-milling under an inert environment) could be employed to obtain BMGs have such average sizes.

Non limiting examples of the water-soluble thermoplastic polymer include PGA polylactic acid PLA, polylactic-co-glycolic acid PLGA, poly(lactic-co-glycolic acid) PDLG (copolymers of DL-lactide and glycolide), or related polymer containing additives as familiar to those skilled in the pertinent as further disclosed herein.

Any embodiments of the composition 210 could further include coupling agents to enhance wetting and thereby promote interfacial interactions. Non-limiting examples of coupling agents include one or more of: gamma;-aminopropyltriethoxysilane, N-(β-aminoethyl)-γ-aminopropyl methyldimethoxysilane or gamma;-aminoethyl aminopropyltrimethoxysilane.

Any embodiments of the composition 210 could further include carbon nanotubes or clay nanopowders to allow further adjustment to the thermal stability, mechanical properties and dissolution rate of the composition. In some such embodiments, the composition can include carbon nanotubes provided at a weight percent of 5 to 10 wt % in the composition or clay nanopowders provided at a weigh percent of 5 to 10 wt % in the composition.

Another embodiment of the disclosure is a method of manufacturing a dissolvable downhole hydraulic frac tool member. FIG. 3 presents an example flow diagram to illustrate embodiments of a method 300 of manufacturing a frac tool member, including any embodiments the frac tool members 104 discussed in the context of FIGS. 1-2C.

With continuing reference to FIGS. 1-3, throughout, the method 300 includes providing (step 305) water-soluble bulk metallic glass particles (e.g., BMG particles 220) having an average size in a range of 50 to 100 nm and providing (step 310) water-soluble thermoplastic polymer particles have an average size in a range of 100 to 250 nm. The method 300 further includes mixing (step 315) the BMG particles and the water-soluble thermoplastic polymer particles together to form a BMG-polymer blend. The method further includes heating (step 320) the BMG-polymer blend to a temperature where the BMG particles are superplastic, the water-soluble thermoplastic polymer particles are moldable, and the BMG particles are embedded in a matrix of the thermoplastic polymer (e.g., polymer matrix 215) to thereby form a BMG-polymer composition (e.g., composition 210). The method includes then forming (step 325) the BMG-polymer composition into the tool member 104.

In some such embodiments, the mixing step 315 can include feeding (step 330) the BMG particles into an extrusion apparatus containing the water-soluble thermoplastic polymer particles therein.

As a non-limiting example, FIG. 4 presents a schematic view of an apparatus 400 (e.g., an extrusion apparatus) where BMG particles 220 are fed (step 330) via a filling pump 410 into a chamber 415 of the apparatus 400 where the BMG particles 220 and polymer particles 417 are mixed, as part of step 315, to form the BMG-polymer blend 420. In some such embodiments as part of the feeding (step 330), the feeding rate can be varied such that different portions of the BMG-polymer blend 420 passing through and out of the apparatus 400 as the composition 210, have graded amounts of the BMG particle embedded in the polymer matrix such as disclosed herein. For instance, the apparatus 400 can have twin screws 430, 432 to facilitate mixing to form the BMG-polymer blend.

In some embodiments, the heating (step 320) raises the BMG-polymer blend and composition to the temperature in a range from 100 to 225° C. One skilled in the pertinent arts would understand how the temperature would be adjusted for the particle BMG particles and polymer particles being used in the method 300. For example for polymer embodiments of PGA, PLA or PLGA the temperature values can range from 220 to 225, 157.5 to 162.5 and 140 to 180° C., respectively. For example in some embodiments where techniques such as ram-extrusion are used to shape the polymer, processing temperatures will be lower, e.g., 125° C. for PGA and 105° C. for PLGA. In some such embodiments, the heating (step 320) can include heating (step 335) the apparatus 400 to the temperature during the mixing (step 315), including the feeding (step 330) of the BMG particles 220. However in other embodiments the heating can include laser ablation, or, additive manufacturing including laser melting or fused filament fabrication as familiar to those skilled in the pertinent arts.

In some such embodiments, forming the BMG-polymer composition into the frac tool member (step 325) can include extruding (step 340) the composition out of the apparatus. For instance, the twin screws 430, 432 of the apparatus 400 can be configured to co-rotate so as to facilitate extruding (e.g., co-extruding the mixture of the superplastic BMG and the moldable or melted polymer) the composition 210 out of the apparatus as part forming of tool member 104 (step 325). Those skilled in the pertinent art would be familiar with performing solid state extrusion procedures at such elevated temperature at which both the polymer and BMG particle become mouldable and superplastic so as to blend and flow like a fluid to form the composition 210.

In some such embodiments, forming the BMG-polymer composition into the frac tool member (step 325) includes transferring (step 345) the composition into a mold and cooling (step 350) to solidify the composition.

For instance, the extruding 340 of the BMG-polymer composition 210 out of the apparatus 400 can facilitate transferring the composition into a mold 440 having an internal cavity 445 with an inverse shape so as to form the tool member 104 in the desired shape (e.g., a frac plug, frac ball or other frac tool member). After the cooling (step 350) the composition can be removed form the mold 440 as the final tool member or further processed, e.g., by milling into the shape of the frac tool member.

Examples

FIG. 5(A) presents example dissolution rates of the example BMG particles CaBMG1 . . . CaBMG6 and, FIG. 5B presents example Young's Modulus and Hardness values, of these BMG particles.

Example processing time and temperature windows of PLLA and PGA are illustrated in FIG. 6A by presenting the amorphous-crystalline transition times for these polymers. Example thermal properties of the example BMG particles CaBMG1 . . . CaBMG6 of the composition are illustrated in FIG. 6B and example processing time and temperature windows for one of the example CaBMG1 BMG particles ($Ca_{57.5}Mg_{15}Zn_{27.5}$) are presented in FIG. 6C. FIGS. 6A-6C together illustrate that these example polymer and BMGs of the disclosure have similar time and temperature windows for thermomechanical co-processing of the BMG particles and polymer thereby facilitating wetting and promoting interfacial interactions as disclosed herein.

FIG. 7 presents example processing time and temperature windows for example magnesium-based BMG particles of $Mg_{65}Cu_{25}Y_{10}$. As illustrated the $Mg_{65}Cu_{25}Y_{10}$ particles have a wide time and temperature windows for superplastic formation. Such particles and similar magnesium based BMG particles with copper included as a first minor element, and other types of rare earth elements included as a second minor element, are dissolvable in water and can have tensile strength values in a range from 700 to 800 MPa. The inclusion of other alloying elements, e.g., alkali earth metal elements, transition metal elements or rare earth elements, as noted elsewhere herein, would facilitate the further tuning of the dissolution rate and the time and temperature windows.

Disclosure Statements.

Statement 1. A downhole hydraulic frac tool for use in a hydraulic fracturing system, the frac tool comprising a dissolvable frac tool member that includes a water-dissolvable composition, the composition including: a water-soluble thermoplastic polymer; and water-soluble bulk metallic glass (BMG) particles, wherein: the BMG particles are embedded within a matrix of the water-soluble thermoplastic polymer, the BMG particles have a greater tensile strength than a tensile strength the water-soluble thermoplastic polymer, and the BMG particles have a higher fracture toughness than a fracture toughness the water-soluble thermoplastic polymer.

Statement 2. The BMG particles have a temperature of superplastic flowability that is in a moldability temperature range of the water-soluble thermoplastic polymer Statement 3. The BMG particles are superplastic at the temperature of superplastic flowability for a time period of at least 300 minutes Statement 4. The BMG particles are superplastic at the temperature of superplastic flowability for a time period in a range from 300 to 600 minutes Statement 5. The BMG particles are wetted with the water-soluble thermoplastic polymer such that a contact angle between the BGMs, when in a super fluid state, and the polymer thermoplastic polymer is less than 90 degrees.

Statement 6. The BMG particles have a partially amorphous structure.

Statement 7. The composition includes a weight percent of the BMG particles in a range from 1 to 35 wt % of a total weight of the composition and balance the water-soluble thermoplastic polymer.

Statement 8. The weight percent of the BMG particles in the composition varies by at least 50 wt % along at least one dimension of the frac tool member Statement 9. The least one dimension is a radial distance from an exterior surface of the frac tool to an interior location of the frac tool that is at least 1 cm from the exterior surface.

Statement 10. The variation in the weight percent of the BMG particles along the least one dimension is graded to change from a low value to a high value from an exterior surface of the tool member to an interior location in the tool member Statement 11. The weight percent of the BMG particle along a least a portion of the at least one dimension is a constant value.

Statement 12. The frac tool member is a frac plug.

Statement 13. The frac plug has a tensile strength that is at least 5 greater than a tensile strength of the polymer alone.

Statement 14. The frac tool member is a frac ball.

Statement 15. The frac ball has a fracture toughness that is at least 5 percent greater than a fracture toughness of the polymer alone.

Statement 16. The BMG particles are composed of a first alkaline earth metal as a major element, a second different alkaline earth metal as a first minor element and a second minor element of zinc.

Statement 17. A method of manufacturing a dissolvable downhole hydraulic frac tool member, comprising: providing water-soluble bulk metallic glass (BMG) particles have an average size in a range of 50 to 100 nm; providing water-soluble thermoplastic polymer particles having an average size in a range of 100 to 250 nm; mixing the BMG particles and the water-soluble thermoplastic polymer particles together to form a BMG-polymer blend; heating the BMG-polymer blend to a temperature where the BMG particles are superplastic, the water-soluble thermoplastic polymer particles are moldable, and the BMG particles are embedded in a matrix of the thermoplastic polymer to thereby form a BMG-polymer composition; and then forming the BMG-polymer composition into the frac tool member.

Statement 18. The heating raises the BMG-polymer blend to the temperature in a range from 100 to 225° C.

Statement 19. The mixing includes feeding the BMG particles into an apparatus containing the water-soluble thermoplastic polymer particles therein, the heating includes heating the apparatus to the temperature during the feeding, and the forming includes extruding the composition out of the apparatus.

Statement 20. Forming the BMG-polymer composition into the frac tool member includes transferring the composition into a mold and cooling to solidify the composition.

Those skilled in the art to which this application relates will appreciate that other and further additions, deletions, substitutions and modifications may be made to the described embodiments.

What is claimed is:

1. A downhole hydraulic frac tool for use in a hydraulic fracturing system, the frac tool comprising:
   a dissolvable frac tool member that includes a water-dissolvable composition, the composition including:
   a water-soluble thermoplastic polymer; and
   water-soluble bulk metallic glass (BMG) particles, wherein:
     the BMG particles are embedded within a matrix of the water-soluble thermoplastic polymer,
     the BMG particles have a greater tensile strength than a tensile strength the water-soluble thermoplastic polymer,
     the BMG particles have a higher fracture toughness than a fracture toughness the water-soluble thermoplastic polymer, and
     the BMG particles have an average size in a range of 50 to 100 nm.

2. The tool of claim 1, wherein the BMG particles are wetted with the water-soluble thermoplastic polymer such that a contact angle between the BGMs, when in a super fluid state, and the polymer thermoplastic polymer is less than 90 degrees.

3. The tool of claim 1, wherein the BMG particles have a partially amorphous structure.

4. The tool of claim 1, wherein the frac tool member is a frac plug.

5. The tool of claim 4, wherein the tensile strength of the frac plug has a value in a range of 5 to 300 percent greater than a tensile strength of the polymer alone.

6. The tool of claim 1, wherein the frac tool member is a frac ball.

7. The tool of claim 6, wherein the fracture toughness of the frac ball has a value in a range of 5 to 250 percent greater than a fracture toughness of the polymer alone.

8. The tool of claim 1, wherein the BMG particles are composed of a first alkaline earth metal as a major element, a second different alkaline earth metal as a first minor element and a second minor element of zinc.

9. A downhole hydraulic frac tool for use in a hydraulic fracturing system, the frac tool comprising:
   a dissolvable frac tool member that includes a water-dissolvable composition, the composition including:
   a water-soluble thermoplastic polymer; and
   water-soluble bulk metallic glass (BMG) particles, wherein:
     the BMG particles are embedded within a matrix of the water-soluble thermoplastic polymer,
     the BMG particles have a greater tensile strength than a tensile strength the water-soluble thermoplastic polymer,
     the BMG particles have a higher fracture toughness than a fracture toughness the water-soluble thermoplastic polymer, and
     the BMG particles have a temperature of superplastic flowability that is in a moldability temperature range of the water-soluble thermoplastic polymer.

10. The tool of claim 9, wherein the BMG particles are superplastic at the temperature of superplastic flowability for a time period in a range from 300 to 600 minutes.

11. A downhole hydraulic frac tool for use in a hydraulic fracturing system, the frac tool comprising:
    a dissolvable frac tool member that includes a water-dissolvable composition, the composition including:
    a water-soluble thermoplastic polymer; and
    water-soluble bulk metallic glass (BMG) particles, wherein:
      the BMG particles are embedded within a matrix of the water-soluble thermoplastic polymer,
      the BMG particles have a greater tensile strength than a tensile strength the water-soluble thermoplastic polymer,
      the BMG particles have a higher fracture toughness than a fracture toughness the water-soluble thermoplastic polymer,
      the composition includes a weight percent of the BMG particles in a range from 1 to 35 wt % of a total weight of the composition and balance the water-soluble thermoplastic polymer, and
      the weight percent of the BMG particles in the composition varies by at least 50 wt % along at least one dimension of the frac tool member.

12. The tool of claim 11, wherein the least one dimension is a radial distance from an exterior surface of the frac tool to an interior location of the frac tool that is a value in a range of from 1 to 4 cm from the exterior surface.

13. The tool of claim 11, wherein the variation in the weight percent of the BMG particles along the least one dimension is graded to change from a low value to a high value from an exterior surface of the tool member to an interior location in the tool member.

14. The tool of claim 11, wherein the weight percent of the BMG particle is a constant value along a portion of the at least one dimension.

* * * * *